United States Patent [19]
Koller

[11] Patent Number: 5,657,676
[45] Date of Patent: Aug. 19, 1997

[54] PROCESS AND APPARATUS FOR THE REMOVAL OF GASES AND/OR LIQUIDS FROM A CONTAINER

[75] Inventor: Manfred Koller, Euerbach-Obbach, Germany

[73] Assignee: Fichtel & Sachs AG, Schweinfurt, Germany

[21] Appl. No.: 330,260

[22] Filed: Oct. 27, 1994

[30] Foreign Application Priority Data

Nov. 2, 1993 [DE] Germany ............... 43 37 307.0

[51] Int. Cl.$^6$ ...................................... B26F 1/00
[52] U.S. Cl. .................... 83/30; 30/361; 30/367; 137/318
[58] Field of Search .............. 30/358, 361, 366, 30/367, 368; 83/54, 13, 30; 227/9, 10; 137/317, 318; 173/170, 204

[56] References Cited

U.S. PATENT DOCUMENTS

| | | | |
|---|---|---|---|
| 2,518,395 | 8/1950 | Sopris | 227/9 |
| 2,655,921 | 10/1953 | Haboush | 173/204 |
| 3,010,430 | 11/1961 | Allen et al. | 173/204 |
| 3,549,074 | 12/1970 | Brunelle | 227/10 |
| 3,868,854 | 3/1975 | Travor et al. | 137/318 |
| 3,990,488 | 11/1976 | Lyon | 141/98 |
| 4,119,257 | 10/1978 | Combette et al. | 227/10 |
| 4,564,138 | 1/1986 | Bethell et al. | 228/176 |
| 4,713,886 | 12/1987 | Ikeda | 30/361 |
| 4,830,254 | 5/1989 | Hsu . | |
| 4,858,811 | 8/1989 | Brosius et al. | 227/10 |
| 5,026,310 | 6/1991 | Mackal et al. . | |
| 5,029,744 | 7/1991 | Pai | 227/9 |
| 5,131,283 | 7/1992 | Canfield | 137/318 |
| 5,215,230 | 6/1993 | Lee | 222/336 |
| 5,215,419 | 6/1993 | Steinhilber | 411/440 |
| 5,363,736 | 11/1994 | Huang | 227/10 |

FOREIGN PATENT DOCUMENTS

| | | |
|---|---|---|
| 0572038 | 12/1993 | European Pat. Off. . |
| 3818669 | 8/1989 | Germany . |
| 9114131 | 3/1992 | Germany . |
| 4113460 | 5/1992 | Germany . |
| 9208979 | 10/1992 | Germany . |
| 4205582 | 8/1993 | Germany . |
| 4215727 | 11/1993 | Germany . |

*Primary Examiner*—Eugenia Jones
*Assistant Examiner*—Charles Goodman
*Attorney, Agent, or Firm*—Nils H. Ljungman and Associates

[57] ABSTRACT

Process for emptying liquids and/or gases from a container, in particular from a shock absorber, in which a tool is used to penetrate the wall of the container to create a drain opening, whereby the tool is driven into the container by means of a pressure pulse. The pressure pulse is thereby generated by means of a controlled propellant charge inside a tool propellant chamber.

19 Claims, 7 Drawing Sheets

PROCESS AND APPARATUS FOR THE REMOVAL OF GASES AND/OR LIQUIDS FROM A CONTAINER

BACKGROUND OF THE INVENTION

1. Field of the Invention

This invention relates to a process and an apparatus for the removal of gases and/or liquids from a container.

2. Background Information

As part of the process of disposing of motor vehicles, the metal parts are separated from the plastic parts, to achieve the necessary degree of material purity for the melt-down process. For the melt-down process, all of the liquids must also be removed from the tanks and containers on a vehicle. Some of the tanks and containers have drain openings, e.g. the ones which contained fluids which had to be changed regularly, such as the coolant in the radiator. The opening of these drain openings, e.g. for the oil filter element, requires special tools which are not always available to the wrecking companies. Therefore the removal of liquids and gases can be a very tedious and time-consuming operation.

German Patent Application No. 41 13 460 C1 discloses an apparatus which penetrates the wall of the container by means of a tool. The tool in question is a drill which must be guided by an operator. One disadvantage of this process is the high amount of force which must be applied, since during drilling, the thrust must be supplied by the operator. It must also be borne in mind that the tanks and containers are very frequently made of materials which are quite hard. The apparatus of the prior art also drains the liquid, so that the operator is forced to keep holding the device until the tank or container is empty. The time required to perform this process makes it unlikely that it could ever be used efficiently.

OBJECT OF THE INVENTION

An object of the present invention is to create a process and an apparatus which essentially make it possible to quickly and cleanly remove the fluid from a tank or container, in particular on a motor vehicle. An additional object of the invention is to require only a reasonable expenditure of effort on the part of the operator.

SUMMARY OF THE INVENTION

The present invention teaches that this object can essentially be accomplished by having the tool driven into the container by means of a pressure pulse.

The operator does not have to exert any major effort for the thrust of the tool. The result is a clear advantage, in terms of time, over the processes disclosed in the known arrangements.

Because the pressure pulse is preferably produced by means of a controlled propellant charge inside a tool propellant chamber, the process can be operated independent of a stationary power source.

The process is generally particularly simple, since the tool preferably creates a drain opening and a ventilation opening in the container. First, the ventilation opening is preferably made. A catch basin can be used, depending on the local conditions. In the second step of the process, the drain opening is preferably created, so that the gas or the liquid can drain out automatically, without pumps or other equipment. The operator's task can be greatly simplified, since he generally does not need to keep pressing any tools against the containers during the draining process. Instead, all the containers can be opened one after another, and the containers can be allowed to drain out simultaneously. The fact that the apparatus is generally independent of outside energy sources which would have to deliver energy via lines essentially represents a major advantage, since for shock absorbers in particular, there is generally a very limited amount of space available in the wheel housings.

The tool can be advantageously guided inside a tool holder, whereby on one end surface, the tool preferably has a connection to a tool propellant chamber, in which a propellant charge can be placed and can be triggered by the operator by means of an actuation mechanism, so that a pressure force can be exerted on the tool. The propellant charge can be provided by small cartridges, which generate a pressure which can be selected as a function of the thickness of the walls of the container. Tests have shown that with a single propellant charge, even two-tube shock absorbers with a base valve can be penetrated cleanly, so that the oil can drain completely out of the shock absorber.

The tool which is part of the device is essentially designed as a nail which preferably has a point on its one end, and in the vicinity of the other end preferably has a stop surface to limit the working stroke. This configuration essentially creates a captive tool which does not represent any hazard to the operator.

In contrast to similar devices of the known arrangements, in which the container has a design penetration point for easier handling of the apparatus, the tool holder has a contour which matches or essentially matches the contour of the container in the vicinity of the opening where the tool exits the apparatus.

It should be understood that when the word "invention" is used in this application, the word "invention" includes "inventions," that is, the plural of "invention." By stating "invention," applicant does not in any way admit that the present application does not include more than one patentably and non-obviously distinct invention, and maintains the possibility that this application may include more than one patentably and non-obviously distinct invention. The applicant hereby asserts that the disclosure of this application may include more than one invention, and, in the event that there is more than one invention, that these inventions may be patentable and non-obvious, one with respect to the other.

One aspect of the invention resides broadly in a process for emptying fluids from a container, such as a shock absorber, with a tool; the tool comprising: a piercing element; the piercing element comprising a pointed tip on one end; a piercing element guide; the piercing element disposed in the piercing element guide; arrangement for accepting an element for generating pressure pulses; a trigger; the trigger comprising an element for releasing pressure pulses; an element for transferring pressure of the pressure pulses to the piercing element; the process comprising the steps of: penetrating a wall of the container with the pointed tip of the piercing element to create a hole in the container; driving the piercing element by releasing the pressure pulse and transferring the pressure pulse to the piercing element.

Another aspect of the invention resides broadly in a tool for piercing and emptying containers, such as shock absorbers, the tool comprising: a piercing element; the piercing element comprising a pointed tip on one end; a piercing element guide for guiding the piercing element; the piercing element disposed in the piercing element guide; arrangement for accepting an element for generating pressure pulses; a trigger; the trigger comprising an element for releasing pressure pulses from the element for generating pressure pulses; an element for transferring pressure of the pressure pulses to the piercing element for piercing a container.

BRIEF DESCRIPTION OF THE DRAWINGS

The invention and its advantages are explained in greater detail below with reference to the accompanying drawings.

DESCRIPTION OF THE PREFERRED EMBODIMENT

Figure 1:
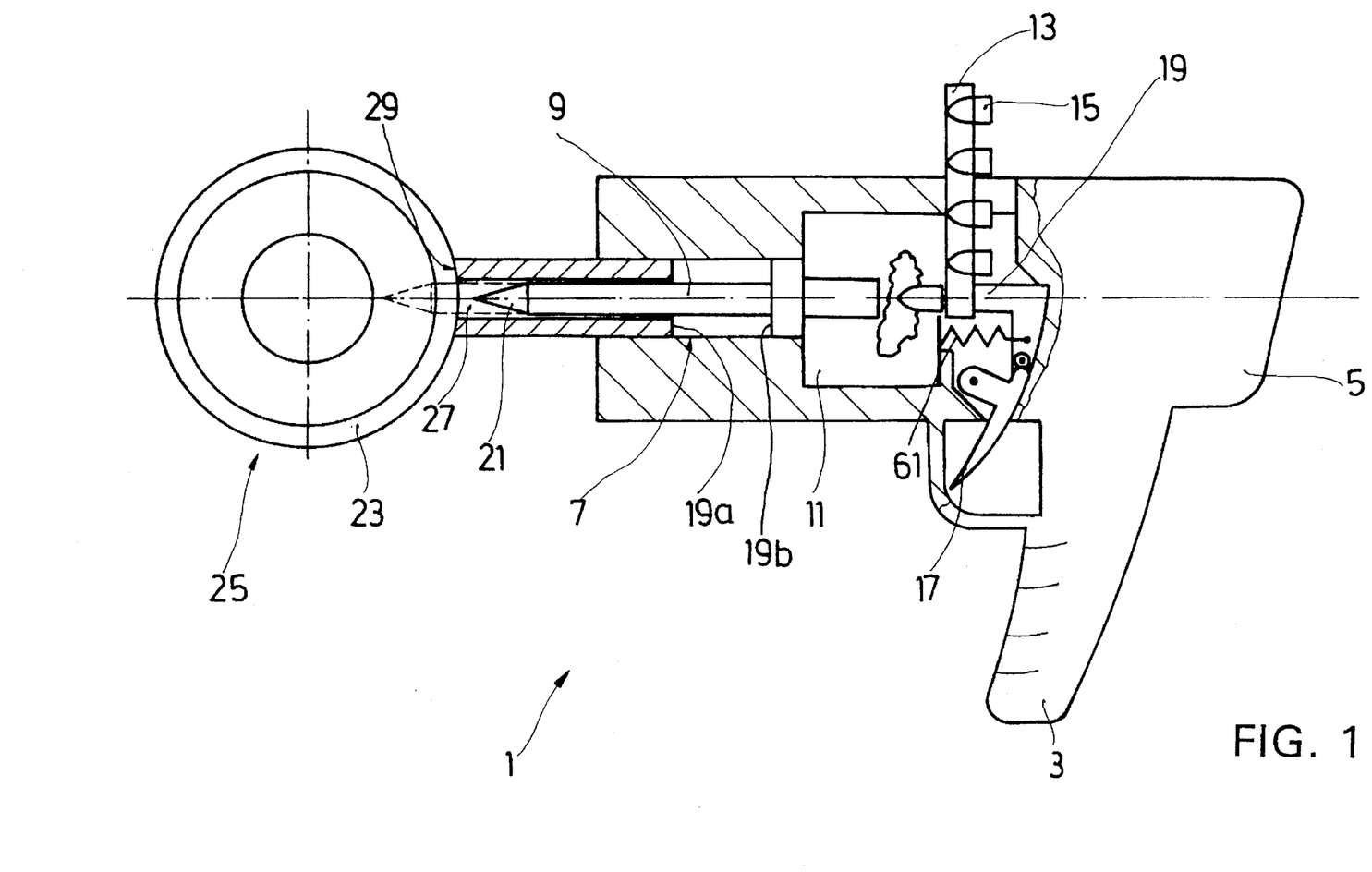
FIG. 1 is a schematic diagram of the apparatus.

FIG. 1 shows an apparatus 1 which includes a housing 5 preferably provided with a handle 3, and also preferably has a guide 7 for a tool 9 preferably in the form of a piercing element. The housing 5 also preferably comprises a tool propellant chamber 11, into which the end of the piercing element 9 preferably extends. A cartridge 13 with propellant charges 15 is preferably placed in the housing 5, and can preferably be ignited by means of a lever mechanism 17 which is preferably connected to a firing pin 19. The spring 61 drives the firing pin 19 into the propellant charge 15. The result preferably is a controlled explosion of the propellant charge 15 inside the tool propellant chamber 11, so that a compression force is preferably exerted on the piercing element 9 which moves the latter axially. The movement of the piercing element 9 is preferably limited by a stop surface 19a, so that only part of the piercing element 9 can exit the apparatus. On its forward end, the piercing element 9 has a tip 21 which, under the force of the pressure pulse inside the tool propellant chamber 11, preferably penetrates a wall 23 of a container 25. For easier handling of the apparatus 1, the apparatus 1, at the exit opening 27, preferably has a contour 29 which matches the contour of the container 25 to be drained, and can also be knurled. The size and weight of the apparatus 1 preferably are approximately the same as a drill, but with the advantage that preferably no power lines are required for its operation. During operation, the full weight of the apparatus 1 preferably need only be supported for a short period of time. The apparatus 1 also has practically no recoil.

In one embodiment of the present invention, the tool propellant charges 15 may be blank cartridges. In another embodiment of the present invention, the tool propellant charges 15 may be gas cartridges containing a gas such as carbon dioxide. In yet another embodiment of the present invention, the tool propellant may be pneumatic in nature, using compressed air to drive the piercing element 9.

Figure 1A:
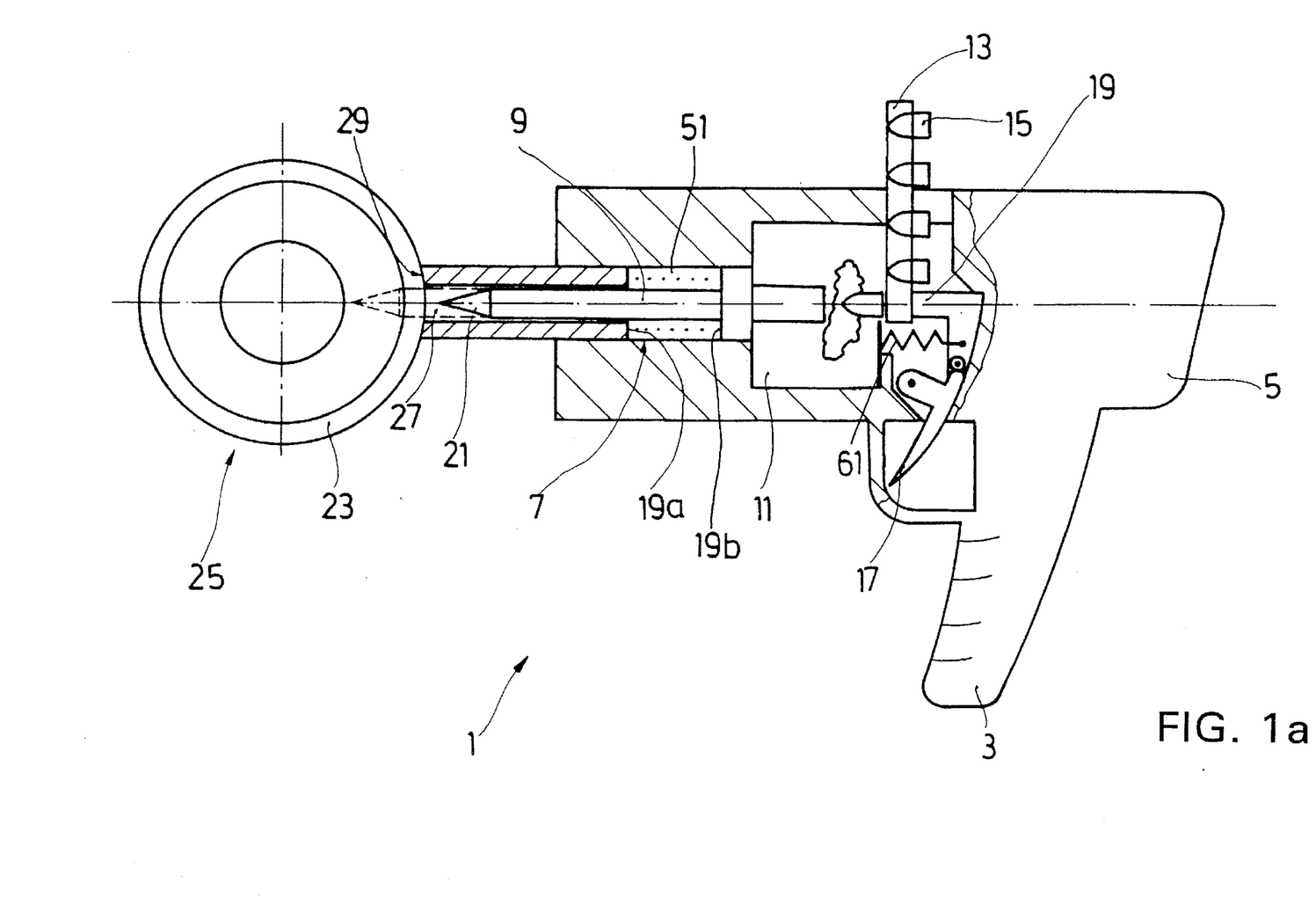
FIG. 1a illustrates a further embodiment of the present invention which includes a spring to return the piercing element to the firing position.

FIG. 1a shows a further embodiment of the present invention. A spring 51 is preferably located between the stop surface 19b and the tool guide 7 so that the piercing element 9 will return to the ready position for further use.

Figure 2A:
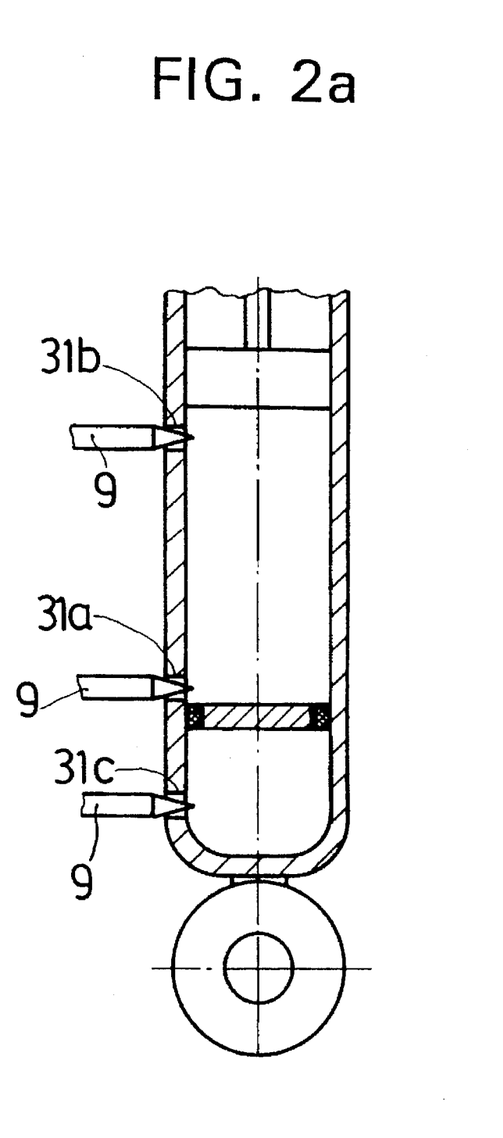
FIGS. 2a and 2b illustrate the placement of the openings on different types of shock absorbers.
Figure 2B:
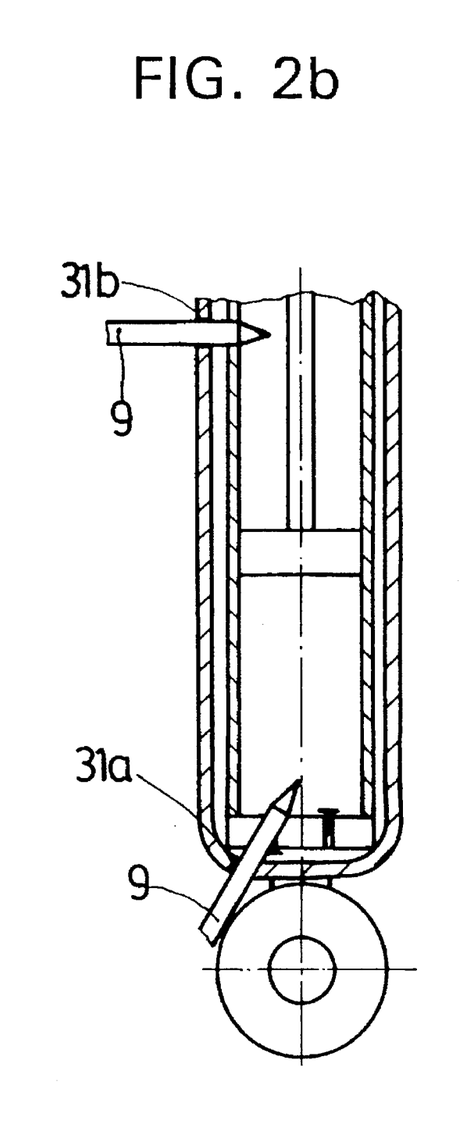

FIGS. 2a and 2b show types of shock absorbers which are conventionally used inside a motor vehicle. On the single-tube shock absorbers illustrated in FIG. 2a, preferably first a pressure discharge opening 31c is made in the gas chamber. Only then are the drain opening 31a and the ventilation hole 31b preferably made.

The process and the apparatus 1 can be used successfully on containers other than shock absorbers. The penetration force makes it possible to penetrate materials with a wall thickness up to 10 mm thick with one propellant charge, so that even transmission and engine housings can be opened easily.

On a two-tube shock absorber as illustrated in FIG. 2b, first a ventilation opening 31b is preferably made underneath the piston rod guide. At that point, practically no oil can drain out, since the rest of the shock absorber is still sealed. A catch basin 33 to collect the oil can easily be put in place before a drain hole 31a is made. The propellant charge also makes it possible for the piercing element 9 to penetrate both tubes of a two-tube shock absorber simultaneously. Tests have shown that it is even possible to penetrate the base with the base valve, to bypass the damping valves of the base valve.

Figure 3:
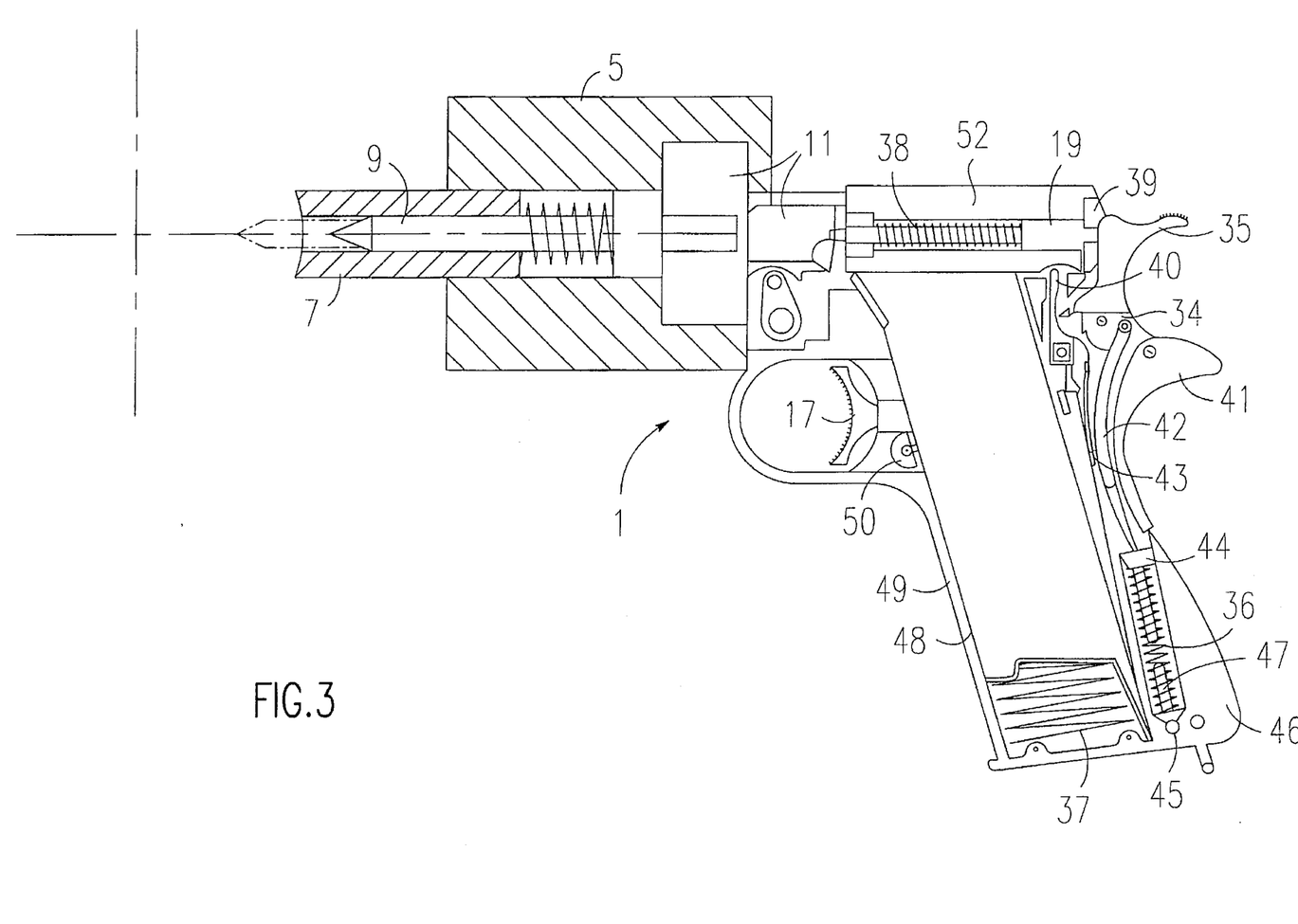
FIG. 3 schematically illustrates a further embodiment of FIG. 1.

FIG. 3 shows a further embodiment of the present invention in schematic form with extensive mechanical detail, with a portion of the housing 5, tool propellant chamber 11, tool 9, and guide 7 preferably attached to an additional portion of the tool propellant chamber 11. A firing pin assembly 52 preferably comprises a firing pin 19, a firing pin spring 38, and a firing pin stop 39. A hammer 35 is preferably provided to hit the firing pin 19, and a disconnector 40 for preferably holding the firing pin assembly 52 in place during loading. A sear 34 is provided for preferably holding the hammer 35 in a cocked position. Additionally, there is preferably a grip safety 41 and a hammer strut 42 attached to a main spring 36 to move the hammer. There is preferably a main spring cap 44 between the hammer strut 42 and main sprang 36. A sear spring 43 preferably operates the sear 34. There is preferably a receiver 49 to house the magazine 48 which is filled with tool propellant charges, which are not shown in this figure. The magazine 48 preferably has a magazine spring 37 for moving tool propellant charges. The apparatus 1 preferably has a housing pin 45, a spring housing 46, and a housing spring retainer 47. Finally, a magazine catch 50 is preferably provided to hold the magazine 48 in place during operation of the apparatus 1. A tool propellant charge is preferably loaded into the pressure chamber 11 by pulling back the firing pin assembly 52 to allow the magazine spring 37 to push the propellant charge 15 into place. When the trigger 17 is pulled, the sear 34 releases the hammer 35, which is driven into the firing pin 19 by the mainspring 36. After firing, the tool propellant chamber 11 is preferably driven back by the pressure pulse, ejecting the spent pressure charge. The magazine spring 37 preferably pushes the next pressure charge into the path of the firing pin assembly 52. The firing pin assembly 52 then preferably pushes the tool propellant charge into the loaded position in the pressure chamber 11.

Figure 4:
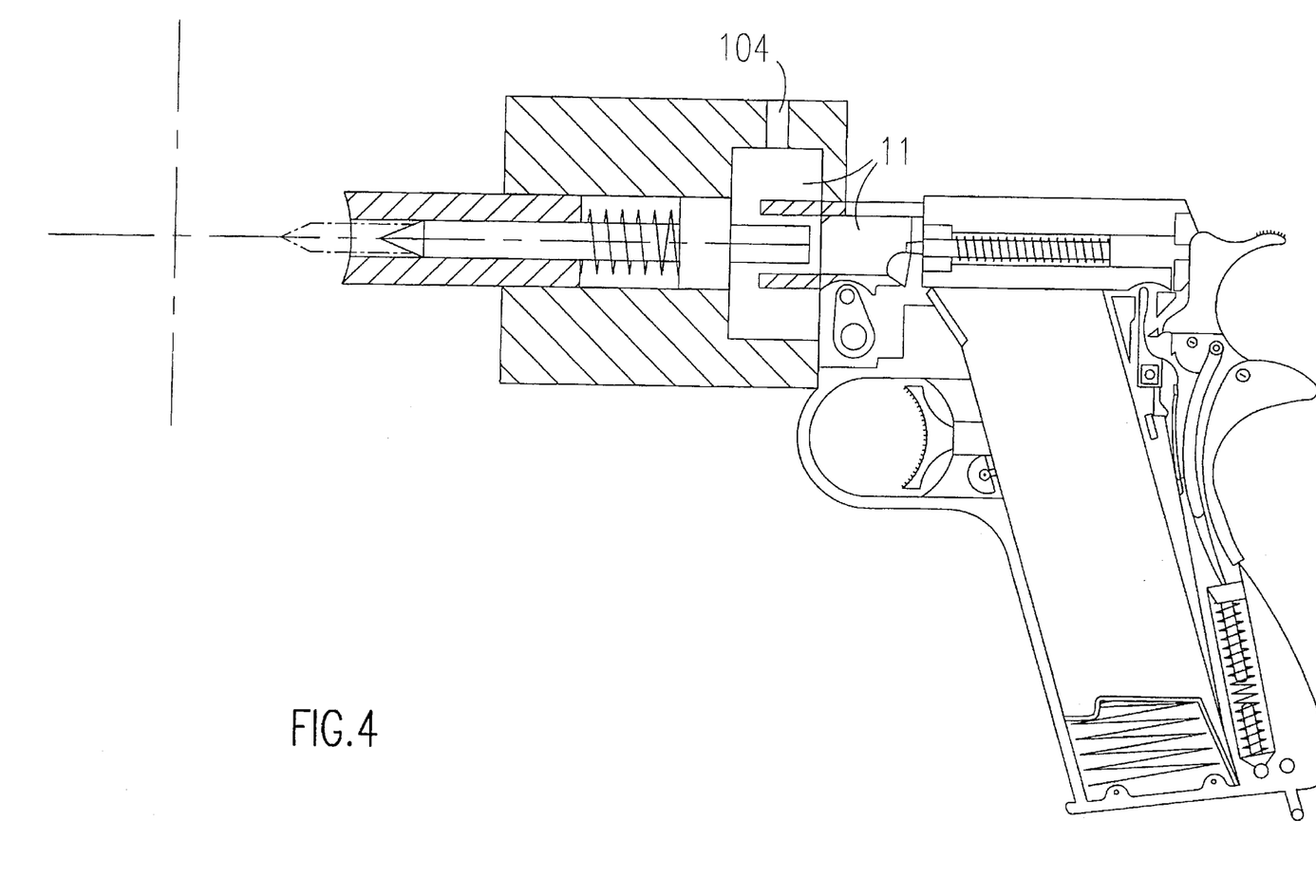
FIG. 4 schematically illustrates yet another further embodiment of FIG. 1.

FIG. 4 shows an alternate embodiment of the present invention with a modified pressure chamber 11 from the pressure chamber as seen in FIG. 3. Also shown in this figure is a vent 104 which may be present in a embodiment of the present invention to help relieve pressure from the pressure chamber 11.

Figure 5A:
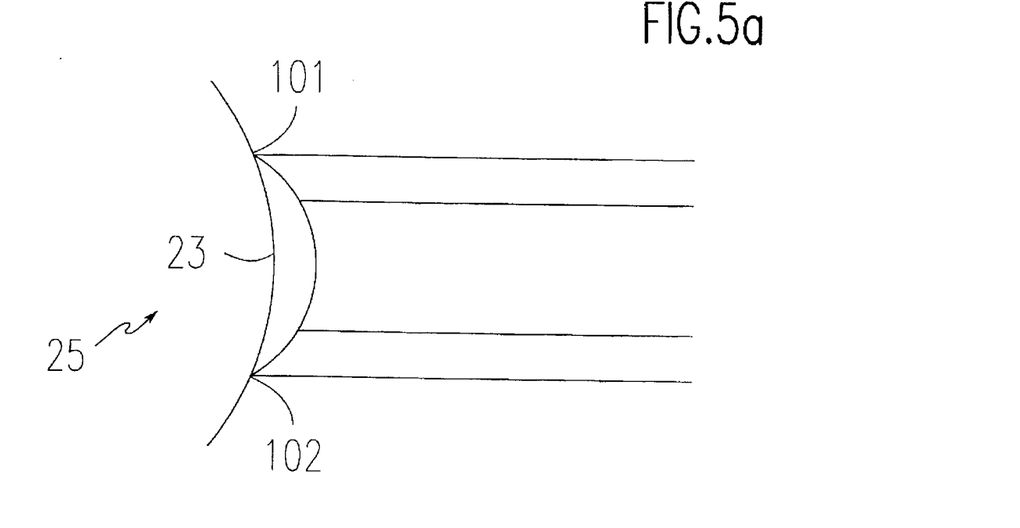
FIGS. 5a and 5b illustrate the effects of different sized shock absorbers.
Figure 5B:
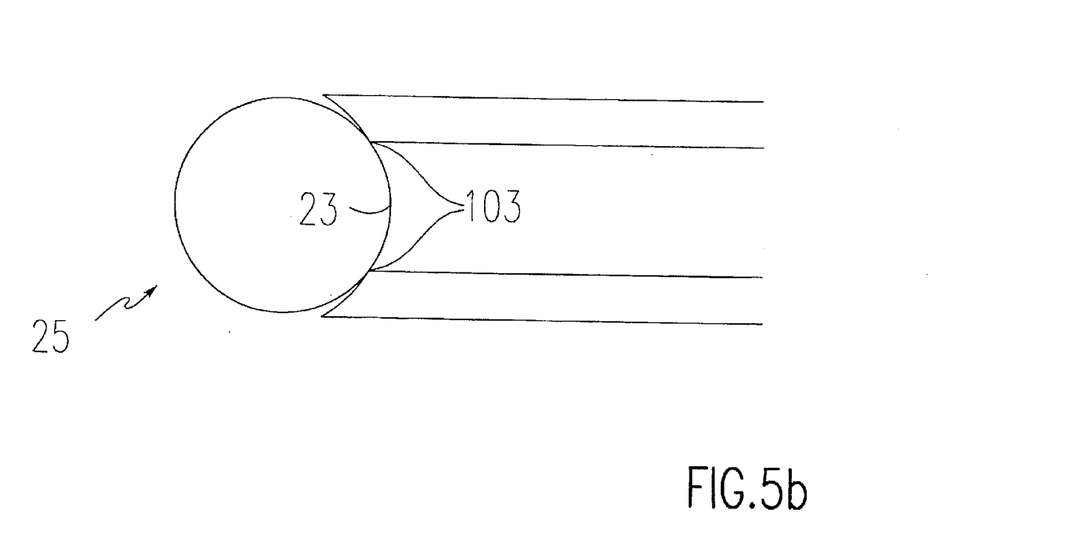
Figure 5C:
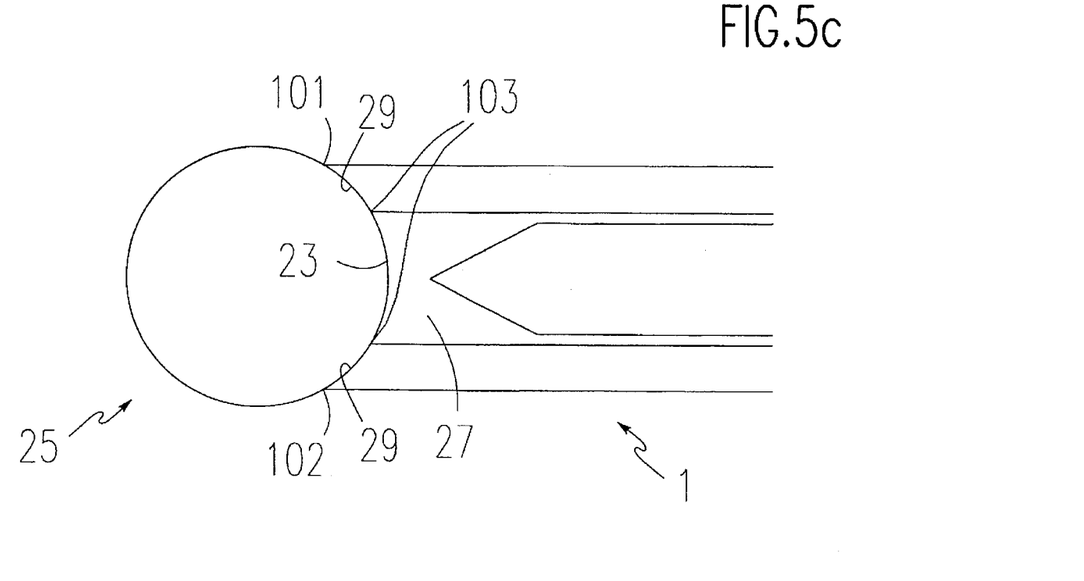
FIGS. 5c and 5d schematically illustrates a close up view of the contour and the contour's fit on the shock absorber's surface.
Figure 5D:
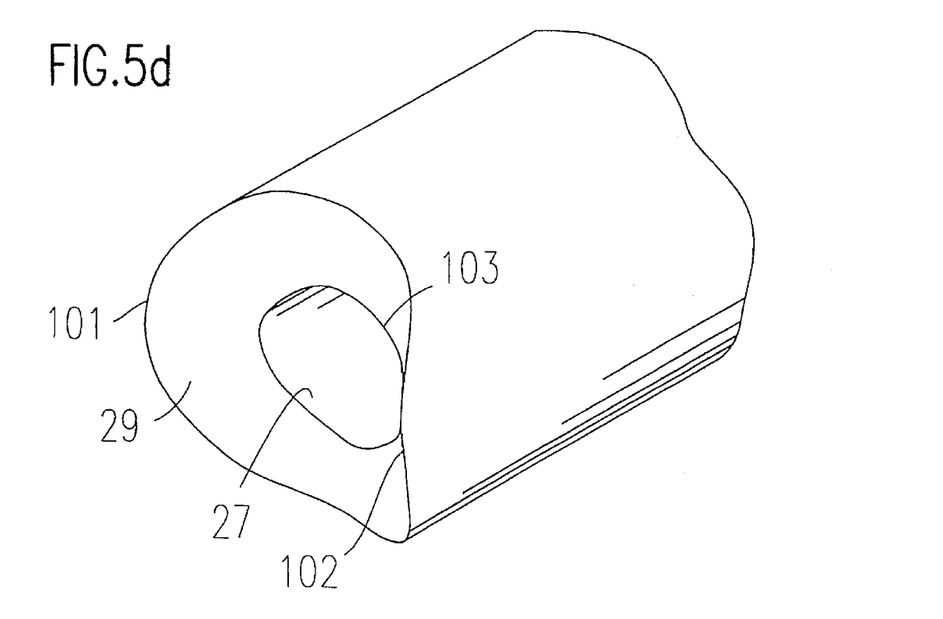

FIGS. 5c and 5d show a close up of the contoured surface 29. The contoured surface 29 of the apparatus 1 around the exit opening 27 preferably is concave in a cylindrical nature so as to match the convex outer surface 23 of a cylindrical object 25, such as a shock absorber. The tips 101, 102 of the contoured surface 29 are preferably extended furthest away from the rest of the apparatus 1. The portion 103 of the contour surface 29 surrounding the exit opening 27 is nearest the rest of the apparatus 1. In a preferred embodiment, the entire contoured surface 29 touches the outer surface 23 of the cylindrical object 25.

FIG. 5a shows a further embodiment of the present invention of FIG. 5 where only the tips 101, 102 of the contoured surface 29 touch the outer surface 23 of the cylindrical object 25.

FIG. 5b shows another embodiment of the present invention of FIG. 5 where only the portion 103 of the contour surface 29 surrounding the exit opening 27 touches the outer surface 23 of the cylindrical object 25.

Within certain limits, which can easily be determined by experimentation, the curvature and angular alignment of the contoured surface 29 can be optimized to perform optimally with shock absorbers of one size, or the contoured surface 29 can be determined to fit optimally to a number of different sizes of shock absorbers.

The alignment of the contoured surface 29 may be adjusted so that the handle 3 of the apparatus 1 is in a plane perpendicular to the axis of the cylindrical object 25 as shown in FIG. 1, or, in a further embodiment, so that the handle 3 of the apparatus 1 is in a plane parallel to the axis of the cylindrical object 25.

One feature of the invention resides broadly in the process for emptying liquids and/or gases from a container, in particular from a shock absorber, in which a tool is used to penetrate the wall of the container to create a drain opening, characterized by the fact that the tool 9 is driven into the container 25 by means of a pressure pulse.

Another feature of the invention resides broadly in the process characterized by the fact that the pressure pulse is generated by means of a controlled propellant charge inside a tool propellant chamber 11.

Yet another feature of the invention resides broadly in the process characterized by the fact that the tool 9 is used to make a drain opening 31a and a ventilation Opening 31b in the container 25.

Still another feature of the invention resides broadly in the apparatus for a process characterized by the fact that the tool 9 is guided inside a tool holder 7, whereby the tool 9 on one end has a connection to a tool propellant chamber 11, in which a propellant charge 15 is placed and triggered by the operator by means of an actuation mechanism 17, 19, so that a pressure force is exerted on the tool 9.

A further feature of the invention resides broadly in the apparatus characterized by the fact that the tool 9 is designed as a nail which has a tip 31 on its one end, and in the vicinity of the opposite end has a stop surface to limit the working stroke.

Another feature of the invention resides broadly in the apparatus characterized by the fact that the tool holder 7 has a contour 29 which matches the contour of the container 25 in the vicinity of an exit opening 27 for the tool 9.

Some types of propellants which could possibly used to propel the tool in accordance with the present invention may be or are disclosed by the following U.S. Patents: U.S. Pat. No. 5,208,420 to Hamilton and Pugh, entitled "Propellant Strip Assembly"; U.S. Pat. No. 5,211,224 to Bouldin, entitled "Annular Shaped Power Charge for Subsurface Well Devices"; U.S. Pat. No. 5,215,419 to Steinhilber, entitled "Explosively Driven Fastener Assembly"; and U.S. Pat. No. 5,181,366 to Smith and Vens, entitled "Crimper-propellant Fill Head".

Some types of cartridges which could possibly be used to store used propellant charges in accordance with the present invention may be or are disclosed by the following U.S. Patents: U.S. Pat. No. 5,212,342 to Eches and Brion, entitled "Container for Receiving Propellant Charges"; U.S. Pat. No. 5,216,200 to Brede et al., entitled "Device for Igniting a Propellant Charge, a Cartridge for the Charge and a Magazine for Holding Cartridges, Especially for Stud Setting or Driving Tools"; and U.S. Pat. No. 5,308,149 to Watson and Young, entitled "Non-explosive Drill Hole Pressurization Method and Apparatus for Controlled Fragmentation of Hard Compact Rock and Concrete".

Some types of trigger mechanisms which could possibly be used in accordance with the present invention may be or are disclosed by the following U.S. Patents: U.S. Pat. No. 5,215,230 to Lee, entitled "Trigger Mechanism for Glue Gun"; U.S. Pat. No. 5,199,506 to Dewey and Allen, entitled "Fastener-driving Tool Assembly with Improved Fastener-loading Features"; and U.S. Pat. No. 5,205,540 to Clapp, entitled "Trigger Valve Assembly".

Some types of propellant chambers which could possibly be used to build a pressure pulse in accordance with the present invention may be or are disclosed by the following U.S. Patents: U.S. Pat. No. 5,181,349 to Schaffer, entitled "Self-powered Unitary Portable Granular Particle Ejector Tool"; U.S. Pat. No. 5,332,140 to Almeras and Herelier, entitled "Apparatus for Applying Fixing Elements, with Plunger, Plunger Return Catch and Pivoting Plug Guide"; and U.S. Pat. No. 5,265,582 to Bhogal, entitled "Controlling the Velocity of Projectiles from Gas-powered Guns".

Some types of contours which could possibly be used in accordance with the present invention may be or are disclosed by the following U.S. Patents: U.S. Pat. No. 5,190,568 to Tselesin, entitled "Abrasive Tool with Contoured Surface"; U.S. Pat. No. 5,228,811 to Potter, entitled "Tool to Assist in the Removal of Rivets"; and U.S. Pat. No. 5,237,739 to Clark, entitled "Locating Tool for Power Pins and Receptacles".

Some types of stopper assemblies which could be used in accordance with the present invention may be or are disclosed by the following U.S. Patents: U.S. Pat. No. 5,297,873 to Komiya, entitled "Stopper Assembly for Use in a Linear, Motion Guide Unit"; and U.S. Pat. No. 5,198,633 to Umeda, entitled "Stopper Device in a Welding Robot Gun".

Some types of breech mechanisms that could be used to discard used propellant charges in accordance with the present invention may be or are disclosed by the following U.S. Patents: U.S. Pat. No. 5,245,907 to Gyre, entitled "Automatic Weapon Munition Feed Device"; U.S. Pat. No. 5,180,879 to Simon et al., entitled "Ammunition Supply Device for an Automatic Weapon"; and U.S. Pat. No. 5,265,504 to Fruhm, entitled "Cartridge Type Screwdriver".

The apparatus in FIGS. 3 and 4 resembles a M1911A1 Colt 0.45 automatic pistol as illustrated in "The Illustrated Science and Invention Encyclopedia," published by H. S. Stuttman, Inc., Westport, Conn., 1983, pages 198–199. The apparatus may also resemble a Luger 7.65 mm automatic pistol or a Mauser C-96 automatic pistol. The structure of these pistols may be used to make an embodiment of the present invention.

The invention as described hereinabove in the context of the preferred embodiments is not to be taken as limited to all of the provided details thereof, since modifications and variations thereof may be made without departing from the spirit and scope of the invention.

What is claimed is:

1. A process for emptying fluids from a container with a tool; said tool comprising: a housing; said housing comprising means for storing propellant, said propellant to generate pressure pulses; a piercing element for piercing a hole in the container; said piercing element comprising a pointed tip on a first end; said housing comprising a piercing element guide for guiding said piercing element; said piercing element being disposed in said piercing element guide; said piercing element comprising a first stop surface for stopping said piercing element from completely exiting said piercing element guide and for permitting said piercing element to be withdrawn from the hole in the container to allow fluid to drain freely through the hole; trigger means for releasing pressure pulses from the propellant; said trigger means being connected to said housing; and said housing comprising a pressure chamber for transferring pressure of the pressure pulses to said piercing element to thus propel said piercing element to pierce the container;

said process comprising the steps of:

placing propellant in said means for storing propellant;

releasing a pressure pulse from said propellant with said trigger means;

transferring said pressure pulse to said piercing element through said pressure chamber;

driving said piercing element with said pressure pulse;

guiding said piercing element with said piercing element guide;

penetrating a wall of the container with said pointed tip of said piercing element to create a drain hole;

stopping said piercing element with said first stop surface and a second stop surface on said piercing element guide to prevent said piercing element from completely exiting said piercing element guide;

withdrawing said piercing element from the drain hole;

allowing fluid to drain from the drain hole immediately; and returning said piercing element into said piercing element guide.

2. The process according to claim 1 wherein:

said housing comprises a handle for permitting the tool to be held in a hand of a user of the tool for adjusting a position, on the container, of said piercing element guide and withdrawing said piercing element guide from the container after piercing;

said handle is a sole means for adjusting the position, on the container, of said piercing element guide and for holding the tool during piercing; and said process comprises the additional step of:

adjusting the position, on the container, of said piercing element guide and holding the tool during piercing with said handle.

3. The process according to claim 2, wherein:

said piercing element comprises a second end;

said first end of said piercing element is opposite said second end of said piercing element;

said first stop surface is disposed on said second end of said piercing element;

said piercing element is disposed in said piercing element guide to slide back and forth in said piercing element guide;

said piercing element guide comprises a first end and a second end;

said second end of said piercing element guide comprises said second stop surface for limiting movement of said first stop surface to stop said piercing element from completely exiting said piercing element guide;

said first stop surface is disposed parallel to said second stop surface;

said piercing element is a unitary element which slides back and forth as one unit;

said piercing element guide comprises a hole;

said piercing element is disposed in said hole;

said hole has a first longitudinal axis;

said hole comprises a first portion and a second portion;

said first portion of said hole is disposed adjacent to said first end of said piercing element guide;

said second portion of said hole is disposed adjacent to said second end of said piercing element guide;

said piercing element comprises a first portion and a second portion;

said first portion of said piercing element is disposed adjacent to said first end of said piercing element;

said second portion of said piercing element is disposed adjacent to said second end of said piercing element;

said first portion of said piercing element has a diameter;

said diameter of said first portion of said piercing element is disposed perpendicular to said first longitudinal axis;

said first portion of said hole has a diameter;

said diameter of said first portion of said hole is substantially similar to said diameter of said first portion of said piercing element;

said second portion of said piercing element has a diameter;

said second portion of said hole has a diameter;

said diameter of said second portion of said hole is substantially similar to said diameter of said second portion of said piercing element;

said diameter of said second portion of said piercing element is greater than said diameter of said first portion of said piercing element;

said diameter of said second portion of said hole is greater than said diameter of said first portion of said hole;

said step of stopping said piercing element comprises limiting movement of said first stop surface with said second stop surface; and said step of guiding said piercing element comprises guiding said piercing element with said first portion and said second portion of said hole in said piercing element guide.

4. The process according to claim 3 wherein:

said second end of said piercing element is disposed to accept pressure from said pressure chamber;

said first end of said piercing element guide comprises an exit opening;

said exit opening for permitting exiting of said pointed tip from said piercing element guide;

said first end of said piercing element guide comprises a contoured surface;

said contoured surface is concave and cylindrical to substantially match a convex and cylindrical contour of the container;

said contoured surface comprises an inner edge disposed adjacent to said exit opening and an outer edge disposed away from said exit opening;

said contoured surface comprises two tipped ends disposed at said outer edge of said contoured surface;

said two tipped ends of said contoured surface are disposed to point away from said second end of said piercing element guide;

at least a portion of said contoured surface contacts the container during operation of said tool; and said process comprises the further steps of:

aligning said piercing element guide with the container with said contoured surface; and holding said first end of said piercing element guide in place on the container with said contoured surface.

5. The process according to claim 4 comprising the additional step of creating a ventilation hole in the wall of the container, said step of creating the ventilation hole comprising the additional steps of:

releasing an additional pressure pulse from said propellant with said trigger means;

transferring said additional pressure pulse to said piercing element through said pressure chamber;

driving said piercing element with said additional pressure pulse;

guiding said piercing element with said piercing element guide;

penetrating the wall of the container with said pointed tip of said piercing element to create the ventilation hole;

stopping said piercing element with said first stop surface and said second stop surface to prevent said piercing element from completely exiting said piercing element guide;

withdrawing said piercing element from the ventilation hole; and returning said piercing element into said piercing element guide.

6. The process according to claim 5 wherein:

said ventilation hole is created before said drain hole.

7. The process according to claim 6 comprising the additional step of creating a pressure discharge hole in the wall of the container, said step of creating the pressure discharge hole comprising the additional steps of:

releasing a further additional pressure pulse from said propellant with said trigger means;

transferring said further additional pressure pulse to said piercing element through said pressure chamber;

driving said piercing element with said further additional pressure pulse;

guiding said piercing element with said piercing element guide;

penetrating the wall of the container with said pointed tip of said piercing element to create the pressure discharge hole;

stopping said piercing element with said first stop surface and said second stop surface to prevent said piercing element from completely exiting said piercing element guide;

withdrawing said piercing element from the pressure discharge hole;

allowing pressurized fluid to discharge from the pressure discharge hole; and returning said piercing element into said piercing element guide.

8. The process according to claim 7 wherein:

said pressure discharge hole is created before said ventilation hole.

9. The process according to claim 8 wherein:

said propellant is a plurality of pressure charges; and said steps of releasing the pressure pulse and releasing the additional pressure pulse and releasing the further additional pressure pulse comprise detonating a pressure charge in said pressure chamber.

10. The process according to claim 9 wherein:

said hole in said piercing element guide comprises an end;

said exit opening is said end of said hole;

said cylindrical surface of said contoured surface comprises a second longitudinal axis;

said contoured surface is cylindrical about said second longitudinal axis; and said second longitudinal axis is substantially transverse to said first longitudinal axis;

said two tipped ends of said contoured surface are located on a line transverse to said first longitudinal axis;

said piercing element guide is disposed adjacent to said pressure chamber;

said trigger means is disposed substantially adjacent to said pressure chamber;

said trigger means comprises:
a firing pin;
a trigger for releasing said firing pin from a cocked position, and
a spring for driving said firing pin to release pressure pulses from the pressure charges;

a portion of said piercing element is disposed in said pressure chamber;

said tool further comprises means for returning said piercing element to a position inside said piercing element guide to be ready for further use;

said returning means comprises a return spring disposed between said first stop surface and said second stop surface;

each of said steps of detonating a pressure charge in said pressure chamber means comprises:
pulling said trigger to release said firing pin; and
driving said firing pin into a pressure charge with said spring to detonate the pressure charge; and each of said steps of returning said piercing element into said piercing element guide comprises returning said piercing element with said return spring.

11. A tool for piercing and emptying containers, said tool comprising:

a housing;

said housing comprising means for storing propellant, said propellant to generate pressure pulses;

a piercing element for piercing a hole in a container;

said piercing element comprising a pointed tip on a first end;

said housing comprising a piercing element guide for guiding said piercing element;

said piercing element being disposed in said piercing element guide;

said piercing element comprising a stop surface for stopping said piercing element from completely exiting said piercing element guide and for permitting said piercing element to be withdrawn from the hole in the container to allow fluid to drain freely through the hole;

trigger means for releasing pressure pulses from the propellant;

said trigger means being connected to said housing; and said housing comprising a pressure chamber for transferring pressure of the pressure pulses to said piercing element to thus propel said piercing element to pierce the container.

12. The tool according to claim 11, wherein:

said housing comprises a handle for the tool to be held in a hand of a user of the tool, said handle for adjusting a position, on the container, of said piercing element guide and withdrawing said piercing element guide from the container after piercing.

13. The tool according to claim 12, wherein:

said handle is a sole means for adjusting the position, on the container, of said piercing element guide and for holding the tool during piercing.

14. The tool according to claim 13, wherein:

said piercing element comprises a second end;

said first end of said piercing element is opposite said second end of said piercing element;

said stop surface is disposed on said second end of said piercing element; and said piercing element is disposed in said piercing element guide to slide back and forth in said piercing element guide.

15. The tool according to claim 14, wherein:

said stop surface is a first stop surface;

said piercing element guide comprises a first end and a second end; and said second end of said piercing element guide comprises a second stop surface for limiting movement of said first stop surface to stop said piercing element from completely exiting said piercing element guide.

16. The tool according to claim 15, wherein:

said first stop surface is disposed parallel to said second stop surface; and said piercing element is a unitary element which slides back and forth as one unit.

17. The tool according to claim 16, wherein:

said piercing element guide comprises a hole;

said piercing element is disposed in said hole;

said hole has a first longitudinal axis;

said hole comprises a first portion and a second portion;

said first portion of said hole is disposed adjacent to said first end of said piercing element guide;

said second portion of said hole is disposed adjacent to said second end of said piercing element guide;

said piercing element comprises a first portion and a second portion;

said first portion of said piercing element is disposed adjacent to said first end of said piercing element;

said second portion of said piercing element is disposed adjacent to said second end of said piercing element;

said first portion of said piercing element has a diameter;

said diameter of said first portion of said piercing element is disposed perpendicular to said first longitudinal axis;

said first portion of said hole has a diameter;

said diameter of said first portion of said hole is substantially similar to said diameter of said first portion of said piercing element;

said second portion of said piercing element has a diameter;

said second portion of said hole has a diameter;

said diameter of said second portion of said hole is substantially similar to said diameter of said second portion of said piercing element;

said diameter of said second portion of said piercing element is greater than said diameter of said first portion of said piercing element; and said diameter of said second portion of said hole is greater than said diameter of said first portion of said hole.

18. The tool according to claim 17 wherein:

said second end of said piercing element is disposed to accept pressure from said pressure chamber;

said first end of said piercing element guide comprises an exit opening;

said exit opening for permitting exiting of said pointed tip from said piercing element guide;

said first end of said piercing element guide comprises a contoured surface;

said contoured surface is concave and cylindrical to substantially match a convex and cylindrical contour of the container;

said contoured surface comprises an inner edge disposed adjacent to said exit opening and an outer edge disposed away from said exit opening;

said contoured surface comprises two tipped ends disposed at said outer edge of said contoured surface;

said two tipped ends of said contoured surface are disposed to point away from said second end of said piercing element guide; and at least a portion of said contoured surface contacts the container during operation of said tool.

19. The tool according to claim 18 wherein:

said hole in said piercing element guide comprises an end;

said exit opening, is said end of said hole;

said cylindrical surface of said contoured surface comprises a second longitudinal axis;

said contoured surface is cylindrical about said second longitudinal axis; and said second longitudinal axis is substantially transverse to said first longitudinal axis;

said two tipped ends of said contoured surface are located on a line transverse to said first longitudinal axis;

said piercing element guide is disposed adjacent to said pressure chamber;

said trigger means is disposed substantially adjacent to said pressure chamber;

said trigger means comprises:

a firing pin;

a trigger for releasing said firing pin from a cocked position, and a spring for driving said firing pin to release the pressure pulses from the propellant;

a portion of said piercing element is disposed in said pressure chamber;

said tool further comprises means for returning said piercing element to a position inside said piercing element guide to be ready for further use; and said returning means comprises a return spring disposed between said first stop surface and said second stop surface.

* * * * *

UNITED STATES PATENT AND TRADEMARK OFFICE
CERTIFICATE OF CORRECTION

PATENT NO. : 5,657,676
DATED : August 19, 1997
INVENTOR(S) : Manfred Koller

It is certified that error appears in the above-identified patent and that said Letters Patent is hereby corrected as shown below:

Column 3, line 22, after 'schematically', delete "illustrates a close up view" and insert --illustrate close up views--.

Column 4, line 66, after '5d', delete "show a close up" and insert --are close ups--.

Signed and Sealed this

Tenth Day of March, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,657,676
DATED : August 19, 1997
INVENTOR(S) : Manfred KOLLER

It is certified that error appears in the above-identified patent and that said Letters Patent is hereby corrected as shown below:

In column 3, lines 23-24, after 'contour', delete "and the contour's fit on the shock absorber's surface." and insert --.--.

In column 5, line 11, after the first occurrence of 'of', delete "FIG. 5" and insert --FIGS. 5c and 5d--.

In column 5, line 15, after the first occurrence of 'of', delete "FIG. 5" and insert --FIGS. 5c and 5d--.

Signed and Sealed this

Twenty-sixth Day of May, 1998

Attest:

BRUCE LEHMAN

*Attesting Officer*  *Commissioner of Patents and Trademarks*